United States Patent [19]

Zagroun

[11] Patent Number: 5,157,313
[45] Date of Patent: Oct. 20, 1992

[54] SYSTEM FOR DEPLOYING AND PARKING A RETRACTABLE MEMBER

[75] Inventor: Francis Zagroun, Paris, France

[73] Assignee: Valeo Systems D'Essuyage, Montigny, France

[21] Appl. No.: 501,492

[22] Filed: Mar. 30, 1990

[30] Foreign Application Priority Data

Mar. 31, 1989 [FR] France .................. 89 04229

[51] Int. Cl.⁵ .............................................. G05D 3/12
[52] U.S. Cl. .................................. 318/266; 318/286; 318/467
[58] Field of Search ............... 318/255, 256, 257, 258, 318/261, 264, 265, 266, 267, 280, 282, 283, 284, 285, 286, 293, 466, 467, 468, 469, 470, 443, 444, DIG. 2; 307/10.1, 10.8; 49/28; 15/250.16, 250.17

[56] References Cited

U.S. PATENT DOCUMENTS

| | | |
|---|---|---|
| 3,121,902 | 2/1964 | Massoll . |
| 4,468,596 | 8/1984 | Kinzl et al. .................. 318/287 |
| 4,583,152 | 4/1986 | Kawai et al. . |
| 4,639,839 | 1/1987 | Miyazawa . |
| 4,700,982 | 10/1987 | Kuraoka et al. ............. 296/107 |
| 4,773,183 | 9/1988 | Okushima et al. ............. 49/28 |
| 4,852,205 | 8/1989 | Tanaka et al. ............ 318/DIG. 2 |
| 4,870,333 | 9/1989 | Itoh et al. .................... 318/286 |
| 4,983,896 | 1/1991 | Sugiyama et al. ........... 318/286 |

FOREIGN PATENT DOCUMENTS

| | | |
|---|---|---|
| 0208027 | 1/1987 | European Pat. Off. . |
| 0235434 | 9/1987 | European Pat. Off. . |
| 0282843 | 9/1988 | European Pat. Off. . |
| 2082777 | 12/1971 | France . |

*Primary Examiner*—Bentsu Ro
*Attorney, Agent, or Firm*—Dennison, Meserole, Pollack & Scheiner

[57] ABSTRACT

The invention is concerned with systems for deploying and parking retractable members such as headlamps or windshield wipers of automotive vehicles. In order to reduce the reaction time when a command is given that countermands a command which is in course of execution, elements are provided for detecting the current state of the system using end stop detectors. The operating program for the system, which controls the parking and deployment functions, is directed towards a parking step or a deployment step, in such a way that the motor currently in operation is immediately reversed (optionally after being braked), when a command is received which reverses the command currently being executed, whether or not the moveable element controlled by the motor has reached the end of its travel.

9 Claims, 6 Drawing Sheets

SYSTEM FOR DEPLOYING AND PARKING A RETRACTABLE MEMBER

FIELD OF THE INVENTION

This invention relates to systems for deploying retractable members and for parking them away, such as may for example be found in automotive vehicles.

BACKGROUND OF THE INVENTION

More and more vehicles are tending to be equipped with retractable headlamps, which the driver only deploys at night, or with retractable windshield wipers which are only deployed when it is raining. When not in use, these members are parked within closed housings which are concealed in the bodywork of the vehicle. By appropriate action on a control switching circuit inside the vehicle, the driver obtains either automatic parking or automatic deployment of the retractable member.

The facility for retraction of such members has a number of advantages, among which may for example be cited an improvement in the aerodynamic characteristics of the vehicle, a reduction in the risk of the members concerned being damaged (for example when the vehicle is passing through an automatic washing machine), and aesthetic improvement generally.

However, retraction of a functional member, for example a windshield wiper, is not a simple operation. In addition, not only is the mechanical construction of retractable members somewhat complex, but their electronic control is also a delicate matter.

Retraction of the windshield wiper blade and of its blade carrier into a housing which is arranged under the hood of the vehicle, in front of the front windshield of the vehicle, necessitates complex successive operations, which comprise:

stopping the sweeping movement of the wiper if wiping is in progress, and return of the blade carrier to a stationary position (commonly referred to, and referred to herein, as its "terminal position");

opening a cover which normally closes the housing, the latter being situated below the hood;

folding the wiper blade along the support arm for the wiper blade carrier, so as to reduce the length of the assembly of the blade and arm to a value which is small enough to enable it to be retracted;

displacing the assembly comprising the wiper blade, the wiper arm and a carrier plate which supports it, into the housing itself under the action of a retracting motor;

and finally, closing the cover so as to totally enclose the wiper within its housing.

Substantially the same operations must also be carried out in the opposite sense for deploying the retractable member from its retracted or parked position. It follows that both retraction and deployment occupy a not insignificant time.

Now, it may happen that the driver of the vehicle may give a command for retraction or deployment of the retractable member, and then immediately afterwards change his mind and so give an order countermanding the previous one. It is highly desirable that the countermanding order should immediately be acted on, so that the driver will obtain the state which he wants (i.e. parked or deployed) as quickly as possible.

In the systems that have been proposed up to the present time, either the countermanding order is carried out only after the system has fully completed its operating sequence in obedience to the first command (in which case the driver's waiting time is maximised), or else the countermanding order is executed at the instant at which the retractable member reaches the end of one of the operating steps which positively define its general sequence of operation. Examples of such substantive operating steps are those listed in the sequence of operation described above.

The above follows, in general, from the fact that the whole sequence of parking and deployment is carried out under the control of a microprocessor or a wired logic system, arranged to draw its data as to the state of the system from sensors which consist of end stop contacts or microswitches arranged in the path of the different moveable members of the system. It is only when a moveable member reaches the end of its movement that the microprocessor knows exactly at what stage of retraction or deployment the system then stands; it thinks that this is the end of a main sequence and that a reverse sequence may be commenced at this stage without any trouble.

SUMMARY OF THE INVENTION

The present invention proposes to improve systems for deploying and parking retractable members, by providing means whereby the command which reverses the command previously given is carried out more rapidly than in the prior art.

In accordance with the invention, there is proposed a system for deploying a retractable member from a housing and parking it therein, the system comprising at least one retractable, moveable element which is displaceable between a parked position and a deployed position, and a retraction motor for moving the element between these positions, a first end stop sensor for detecting when the said element reaches an end of its movement to its parked position, and a second end stop sensor for detecting when the moveable element reaches its deployed position, characterised in that the system includes means for effecting a reversal of the driving direction of the retraction motor when, simultaneously, firstly a command is given that reverses a command which is in course of being carried out, and secondly the end stop sensors indicate that the moveable element is in neither its parked position nor its deployed position.

In another arrangement, there is proposed a system for deploying a retractable member from a housing and parking it therein, the system comprising at least one retractable, moveable element which is displaceable between a parked position and a deployed position, and a retraction motor for moving the element between these positions, a first end stop sensor for detecting when the element reaches an end of its movement to its parked position, and a second end stop sensor for detecting when the moveable element reaches its deployed position, characterised in that the system includes, firstly, detecting means adapted to detect the speed of operation of the motor, and secondly means for reversing the driving direction of the motor when, simultaneously, a command is given that reverses a command which is in course of being carried out and the detecting means indicate that the moveable element is disposed somewhere between the two end stop detectors.

In accordance with another feature of the invention, the reversal of the driving direction of the retraction motor is immediate.

In accordance with a further feature of the invention, the means for reversing the driving direction are arranged to control a braking means for effecting braking prior to the reversal taking place.

The braking operation is preferably carried out by applying a short circuit across the input of the retraction motor.

When the retractable member comprises several moveable elements pivoted to each other and displaceable under the action of one or more motors, it is of course preferable to provide that the driving direction of each motor is able to be reversed immediately or after braking, if the corresponding moveable element, or each such element, is not in either its parked position or its deployed position when a countermanding operating order is received.

These arrangements enable the reaction time of the system, between two conflicting orders, to be minimised.

The operation of the system in accordance with the invention preferably includes a deployment cycle for deploying the retractable member from its parked position, a parking cycle for retracting the retractable member, and two examination cycles for examining the current state of the system at any given moment. The examination cycles are carried out by analysing the state of the end stop sensors of the system. The first of these cycles is a "start" cycle, performed when an order for the retractable member to commence working (and therefore an order for its deployment) is given. The second examination cycle is performed when an order to stop (and therefore to retract) is given. Depending on the result of the examination in the relevant cycle, an appropriate stage of either the deployment cycle or the parking cycle is then initiated. The stage which is commenced here corresponds directly with the state detected by the end stop sensors. However, their significant states do not mainly consist of states in which all of the moveable elements are at the end of their movement. More often, they are those states which are defined by the fact that a given moveable element is not at a predetermined position at the end of its movement.

Further features and advantages of the invention will appear from a reading of the detailed description which follows, and which is given by way of example only, with reference to the accompanying drawings.

DESCRIPTION OF THE PREFERRED EMBODIMENT OF THE INVENTION

Figure 1:
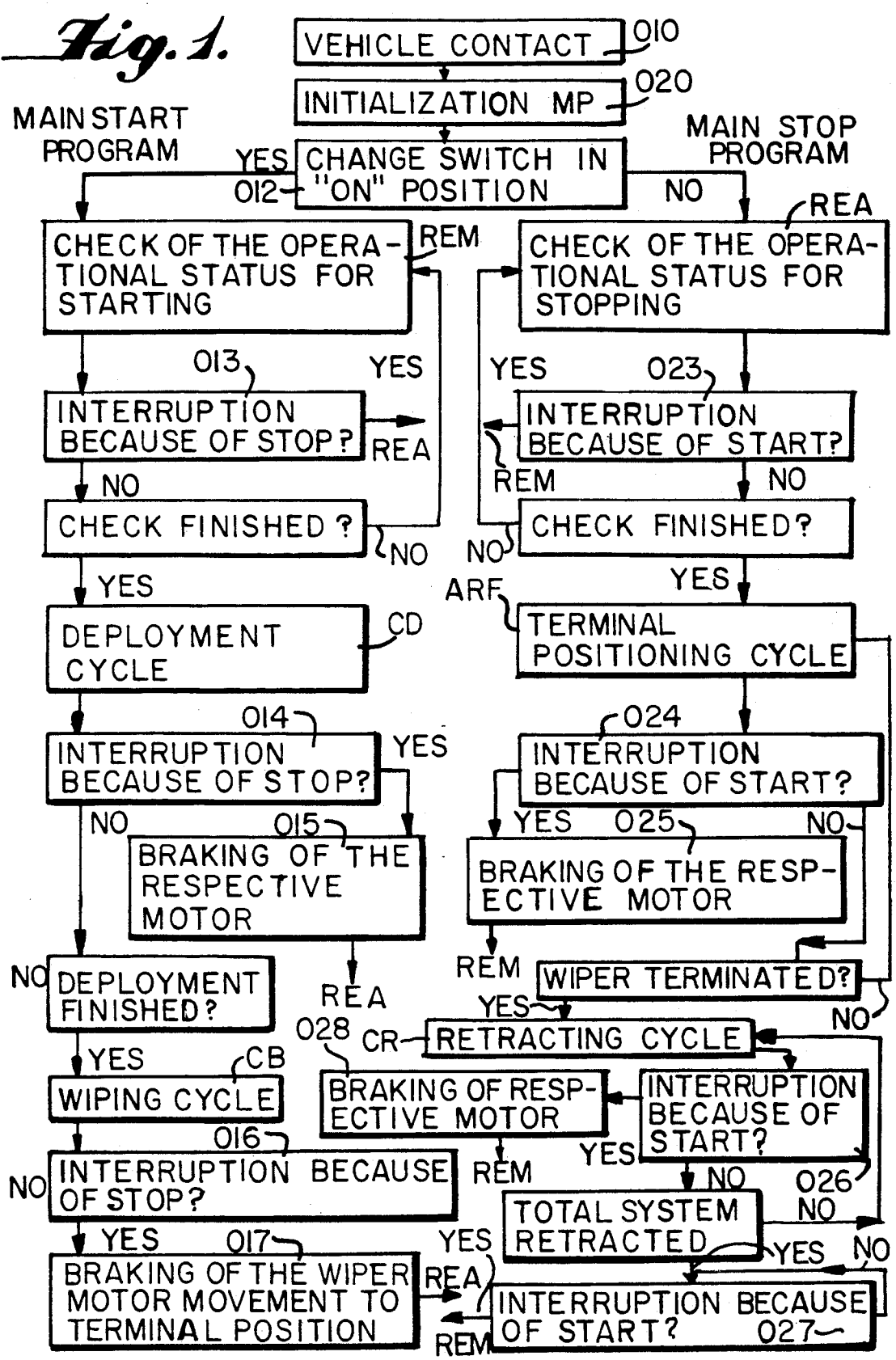
FIG. 1 is a diagram showing the operation of the system generally.

The system according to the invention will be described here specifically in relation to a windshield wiper assembly of a vehicle, which can be retracted into a housing which is concealed under the hood of the vehicle in front of its front windshield. However, the description will not go into the detail of the physical construction of the moveable components of the wiper assembly, since such structures have already been dealt with in the published literature; and the invention is concerned specifically, not with such a structure but with its electronic control. At the same time it must be emphasised that the invention is concerned with electronic control not only of windshield wipers, but also in other situations in which a retractable member is to be retracted or deployed rapidly.

Accordingly, it will merely be put on record here that, in one embodiment, the retractable wiper assembly includes a support or carrier plate, which is mounted in such a way as to swing between a position in which it is retracted into the housing and a position in which it is extended or deployed from the latter. The carrier plate is driven in this swinging movement by a retraction motor. The carrier plate supports the assembly of a support arm for a windshield wiper blade carrier, with a blade carrier which is pivoted on this support arm (the wiper blade itself being secured on the blade carrier); the plate also, as a rule, carries a motor for deploying the blade carrier; this motor serves to drive the blade carrier between a parked position, in which it is withdrawn against the support arm, and an extended position in which it is deployed as a longitudinal extension of the support arm; and finally the carrier plate carries a windshield wiper motor which drives the assembly of the support arm with its blade carrier in back and forth rotational movement so as to sweep the windshield of the vehicle.

In addition, the parking housing of the system is provided with a cover which:

opens in order to enable the wiper assembly to be moved out of the housing;

closes when the carrier plate is in its deployed position;

reopens to allow the assembly to re-enter the housing; and closes again when the assembly has re-entered the housing.

The assembly of the retractable system is controlled by a microprocessor which is connected in a conventional way with read only program memories, working memories, signal transmission lines and input-output ports. The corresponding electronic circuit will not be described, since it can be of a completely conventional kind. However, the operating sequences whereby the invention can be applied will be described, because it is from these sequences that the best understanding of the invention and its practical application can best be achieved.

The microprocessor is connected through its input-output ports, firstly to each of the actuating motors for the various moveable members, so as to displace the latter either in a retracting or parking direction or in an extending or deploying direction, and secondly to sensors which enable the current state of the system to be defined, that is to say the position of each movable element at any given moment. Finally, the microprocessor is connected through a port to a master switching circuit for controlling the starting and stopping of the windshield wipers.

In another arrangement, the position of each moveable element at a given moment is defined by means which are adapted to detect the speed of operation of the motor, and which are coupled with each movable element except that of the windshield wiper drive motor.

To this end, provision is made for measuring, in each cycle, the intensity of the current used by the motor and to take the difference between the voltage of the battery and the voltage of the motor resulting from the intensity of the current being used. This difference gives an approximate picture of the speed of the motor, and a computer circuit then calculates the law governing the motion of the motor, and therefore its position. The latter can be verified at the end of the travel of the wiper by means of electrical end stop contacts.

There may of course be further elements, such as a rain detector which measures the incident humidity and transmits a signal corresponding to the presumed presence of rain, in such a way as automatically to initiate the steps whereby windshield wiping is commenced.

The master switching circuit may have a number of other functions, such as choice of a windshield wiping speed, choice of wiping mode as between continuous or intermittent, whether wiping is to be accompanied by washing, and so on. These different possibilities are mentioned here simply by way of example.

The sensors which define the state of the system are conventional electrical end stop contacts, which are so located as to change state when the associated element reaches its final parked or deployed position. They may be placed slightly ahead of the final position in order to compensate for the braking time of the motor. They then remain in this state so long as the associated element remains in its parked or deployed position, as the case may be. There are two sensors for each of those moveable elements that are arranged to pass, independently of the others, from a retracted or parked position to an extended or deployed position under the action of a respective motor. One of the sensors is therefore in end stop contact in the parked position, while the other is in end stop contact in the deployed position.

The operation of the system, carried out under the control of a microprocessor, will now be described in detail, since it is in its mode of operation that the system is original and ought to be described.

The operation of the system takes place in accordance with a general program which comprises two main branches, one of which corresponds to the steps in the operation of deploying the wiper assembly into its working position, while the other corresponds to the steps of returning the system to its parked position. The operation switches from one branch to the other when a command is given that is the reverse of the command last executed.

The general program is shown schematically in FIG. 1. It begins when the ignition key of the vehicle is turned (step 010), and also includes a microprocessor activating step (020), in which energisation of registers, memories, various test programs etc. takes place.

In general terms, as in any microprocessor, the program may be switched towards sub programs, either in response to tests of condition, or in response to interruptions, whether these interruptions are periodic or whether they arise externally. In this description, the preferred arrangement will be adopted, in which operation of the microprocessor may be modified either by regular interruption signals, or by interruption signals from the master control switching circuit, which is located in the cabin of the vehicle.

If the state of the control switching circuit, after the microprocessor has been energised, corresponds to a call to initiate the wiping of the windshield, the general program is directed towards a main start program PPM, which includes the deployment of the system and also the actual operation of wiping the windshield. If, on the other hand, the state of the switching circuit corresponds to a call to stop the wiping operation, the program is directed to a main stop program PPA. This main stop program includes stopping the wiping operation in those cases where it is currently taking place, together with the parking of the wiper assembly in its retracted position.

(A) MAIN START PROGRAM PPM (FIG. 1)

When there is a call for starting, the first step is to carry out a cycle REM, so as to examine the current state of the system. As will be seen, this cycle will more generally be reverted to every time the control switching circuit emits an interruption signal corresponding to a command for starting, that is to say not simply at the outset (i.e. starting in the parked position of the whole wiper assembly), but also when the wiper assembly is in course of being parked.

The examination cycle REM will be described in greater detail later in this description, with reference to FIG. 2. It consists in an examination of the state of the different end stop contacts of the system, and it provides an indication, for example in the form of a step number, as to the current configuration of the wiper assembly. However, by contrast with what has been the practice in the prior art, it will be seen that the step numbers detected do not necessarily correspond to the terminations of particular steps, but more often relate to steps which are in the course of being carried out.

During the course of the examination cycle REM, the microprocessor is able to receive an interruption signal coming from the master control switching circuit. This step (013) is shown as following the examination cycle REM, but it must be understood that this is an interruption signal which may occur during the course of a cycle. In fact, the interruption signals will in general represent periodic interruptions, in the course of which the state of the control switching circuit is verified. If the interruption signal does not correspond to a call for stopping, and if the examination has not been completed, the REM cycle is repeated. If the examination is complete, the program continues by way of a deployment cycle CD. As can be clearly seen, entry into the deployment cycle depends on the conclusion reached in the examination cycle. However, if the interruption signal corresponds to a call for the system to stop, the program is immediately directed towards the second main branch, that is to say towards the main stop program PPA. More precisely, it is directed towards another cycle for examination of the current state of the system (cycle REA).

Figure 4:
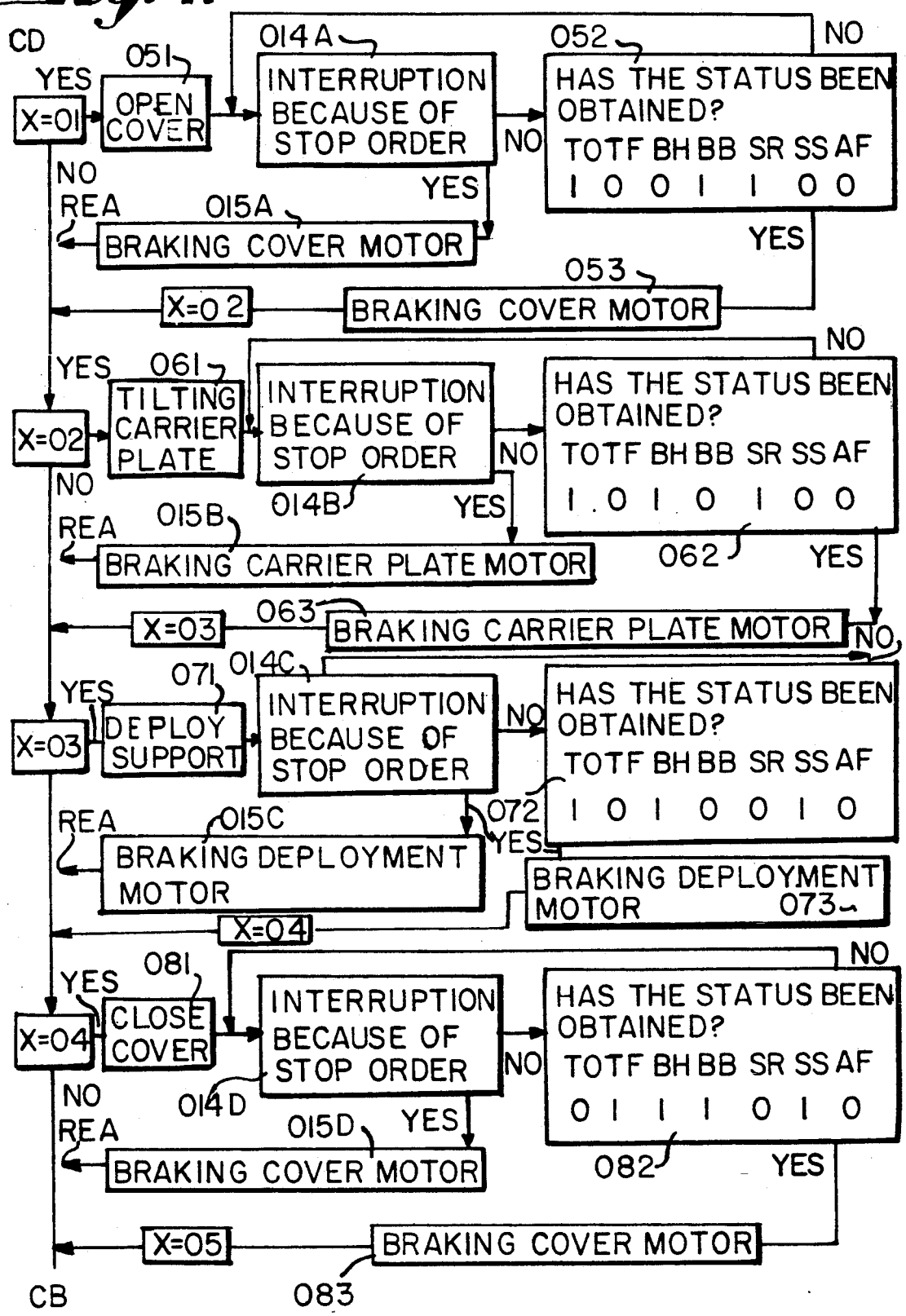
FIG. 4 is a diagram showing the operation during a deployment cycle.
Figure 5:
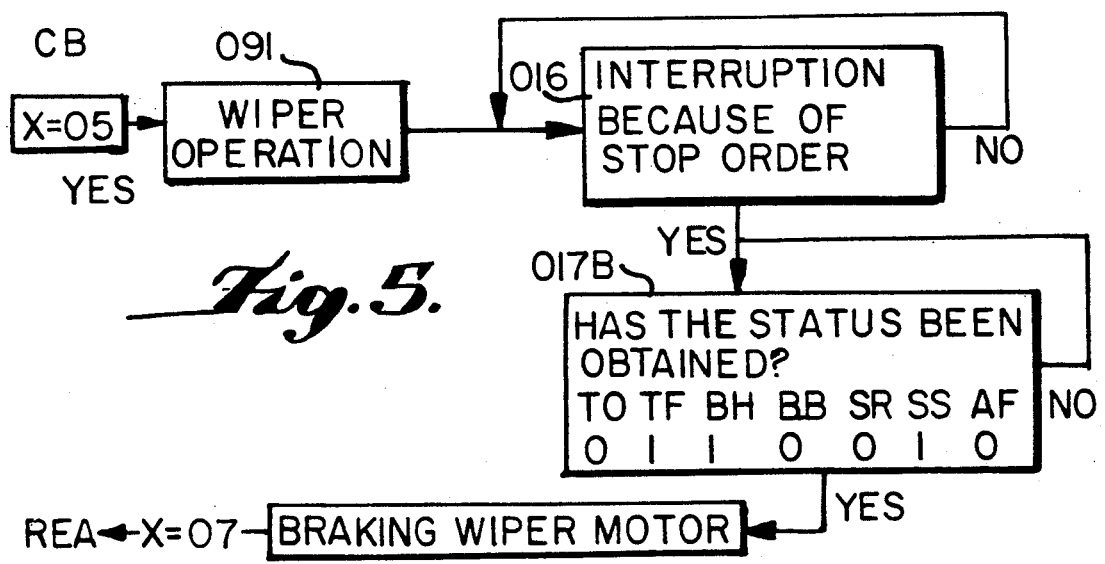
FIG. 5 is a diagram showing the operation during a windshield wiping cycle.

The deployment cycle CD will be described in detail later in this description, with reference to FIG. 4. Depending on what step the system is engaged in at the termination of the REM cycle, one or other of the steps of the CD cycle is entered; it is indeed possible to omit this cycle completely and to pass directly to a windshield wiping cycle CB, if it appears that the wiper assembly is already fully deployed. The steps of the deployment cycle CD correspond to the opening of the cover that normally keeps the retraction housing closed; pivoting of the carrier plate to its raised position; deployment of the wiper arm into its extended position; and re-closing of the cover.

At any instant, or at regular intervals during the course of the deployment cycle, the microprocessor is able to receive an interruption signal for the examination of the control switching circuit (step 014). If this interruption signal does not correspond to a call for stopping, and if deployment has not been completed, the deployment cycle is repeated. If it has been completed, the circuit passes on to the next following cycle, which is the cycle CB for wiping of the windshield by the deployed wiper. However, if on the other hand the interruption signal corresponds to a call for stopping, made by the driver of the vehicle, it passes instead to the second branch of the main program, that is to say to the main stop program PPA. More precisely, it passes to the examination cycle REA of this program PPA.

However, during the course of the deployment cycle, the system will then find itself to be in a step corresponding to the actuation of a motor to shift a moveable element from its retracted or parked position to its extended or deployed position. Therefore, it is preferably arranged that this motor is braked (step 015), by short circuiting its input before the system passes to the cycle REA.

The wiping cycle CB is started after the deployment cycle has finished. This cycle may itself als be interrupted by a call for interruption (step 016), so that the state of the master switching circuit can be examined. It is repeated if the interruption signal does not correspond to a call for stopping. If it does correspond to a call for stopping, the system reverts to the main stop program PPA, and more precisely to the examination cycle REA, though after waiting for the windshield wiper to reach the appropriate end of its sweep at which it can then be parked (its position at this end of the sweep will be called the "terminal position"). It is of course not desirable for the wiper to stop part way across the windshield. When the wiper reaches its terminal position, it is, in addition, preferably arranged that the wiper motor is braked by short circuiting its input (step 017).

(B) MAIN STOP PROGRAM PPA (FIG. 1)

When there is a call for stopping, a cycle REA is first carried out, in which the then current state of the system is examined. This cycle is similar to the cycle REM, but is not identical with it. It is in fact a cycle specifically directed to examination with a view to stopping the operation of the wiper, while the cycle REM is a cycle for examination with a view to starting it. The states of the system that are detected by the cycles REA and REM lead to different operations. It will also be seen that the cycle REA is reverted to not only when there is a call for stopping after a wiping cycle has been set up, but more generally every time the control switching circuit emits an interruption signal corresponding to a command to stop, including the case where this occurs during a deployment operation.

Figure 3:
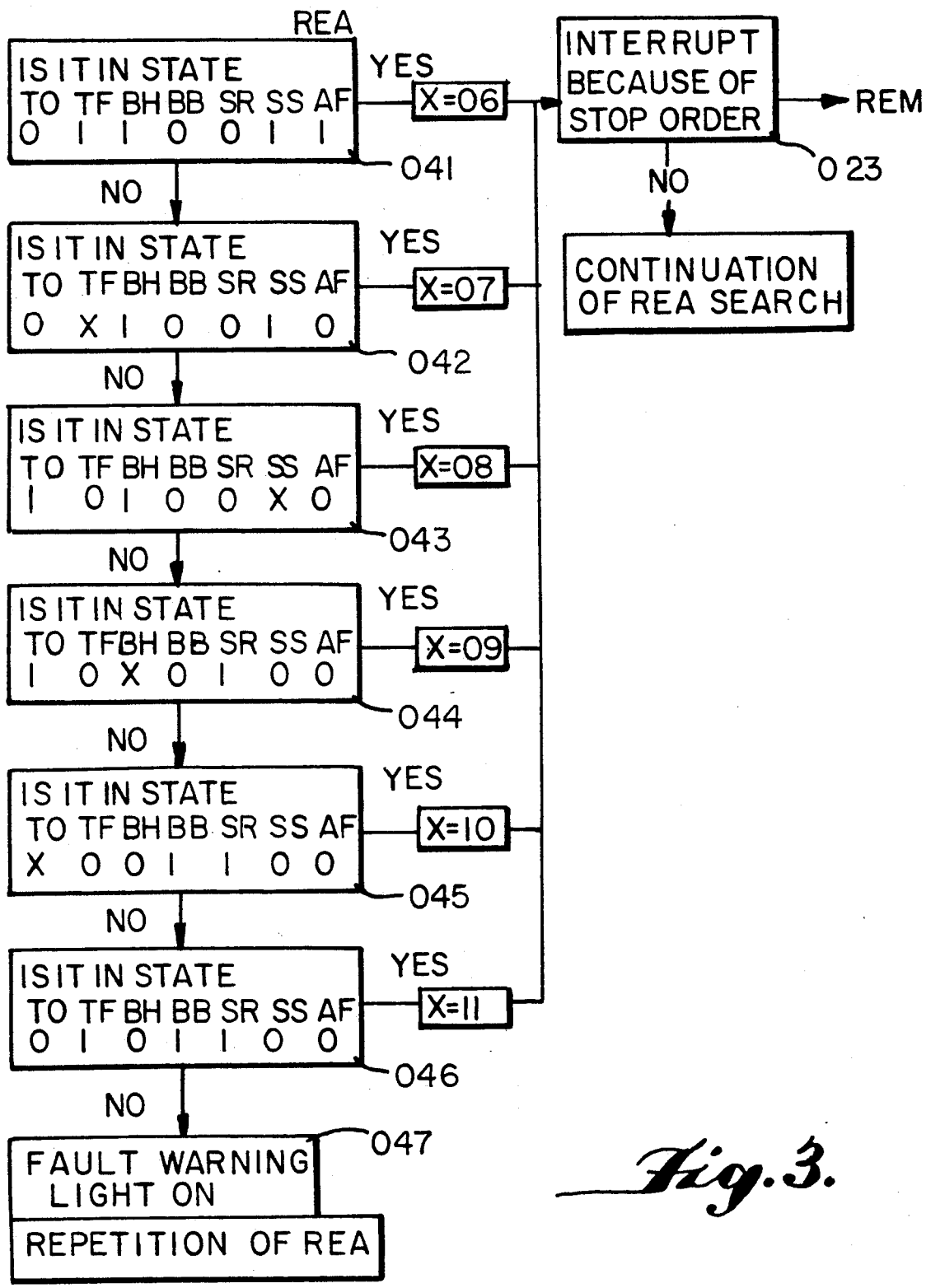
FIG. 3 is a diagram showing the operation of the system in the course of a cycle of examining the state of the system with a view to stopping and parking the working part.

The examination cycle REA will now be described in detail with reference to FIG. 3.

During the course of the examination cycle REA, the microprocessor is able to receive an interruption signal for examination of the master control switching circuit. If the interruption signal does not correspond to a call for starting, and if the examination has not been completed, the cycle REA is repeated. If the examination is complete, the program continues by way of a cycle ARF, for putting the wiper motor into its terminal position, except of course if it is already in that position (which is then signalled by way of the result of the examination in cycle REA). However, if the interruption signal corresponds to a call for starting, the program is immediately directed to the first main branch, that is to say to the main start program PPM. More precisely, it is directed to the examination cycle REM.

Figure 6:
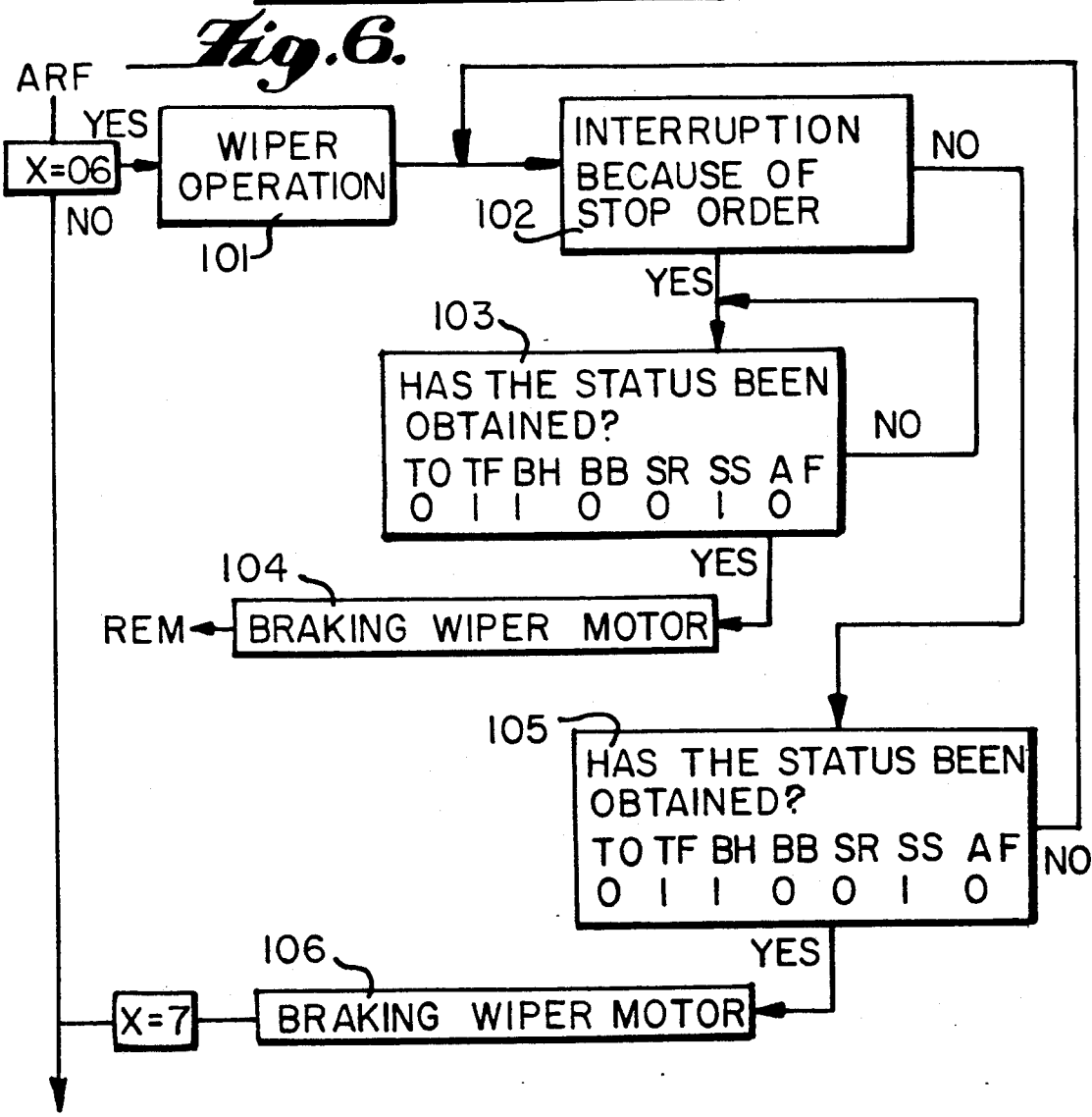
FIG. 6 is a diagram showing the operation for terminating windshield wiping.

The terminal positioning cycle ARF will now be described in detail with reference to FIG. 6. However, if it appears after the appropriate examination that the wiper motor is already in its terminal position, the cycle ARF is omitted, and the system passes directly to a cycle CR for returning the wiper assembly into the retracted position.

During the course of the terminal positioning cycle ARF, an interruption signal from the control switching circuit (step 024) may again be received. If this interruption signal does not correspond to a call for restarting, and if the wiper has not reached its terminal position, the cycle ARF is repeated. If it is complete, the system passes to the next following cycle, which is the cycle CR for retracting the wiper assembly to its parked position. However, if the interruption signal corresponds to a command by the driver of the vehicle to recommence the wiping operation, the system reverts to the first main branch PPM of the general program, and more precisely to the examination cycle REM, after the wiper motor has been braked (step 025).

Figure 7:
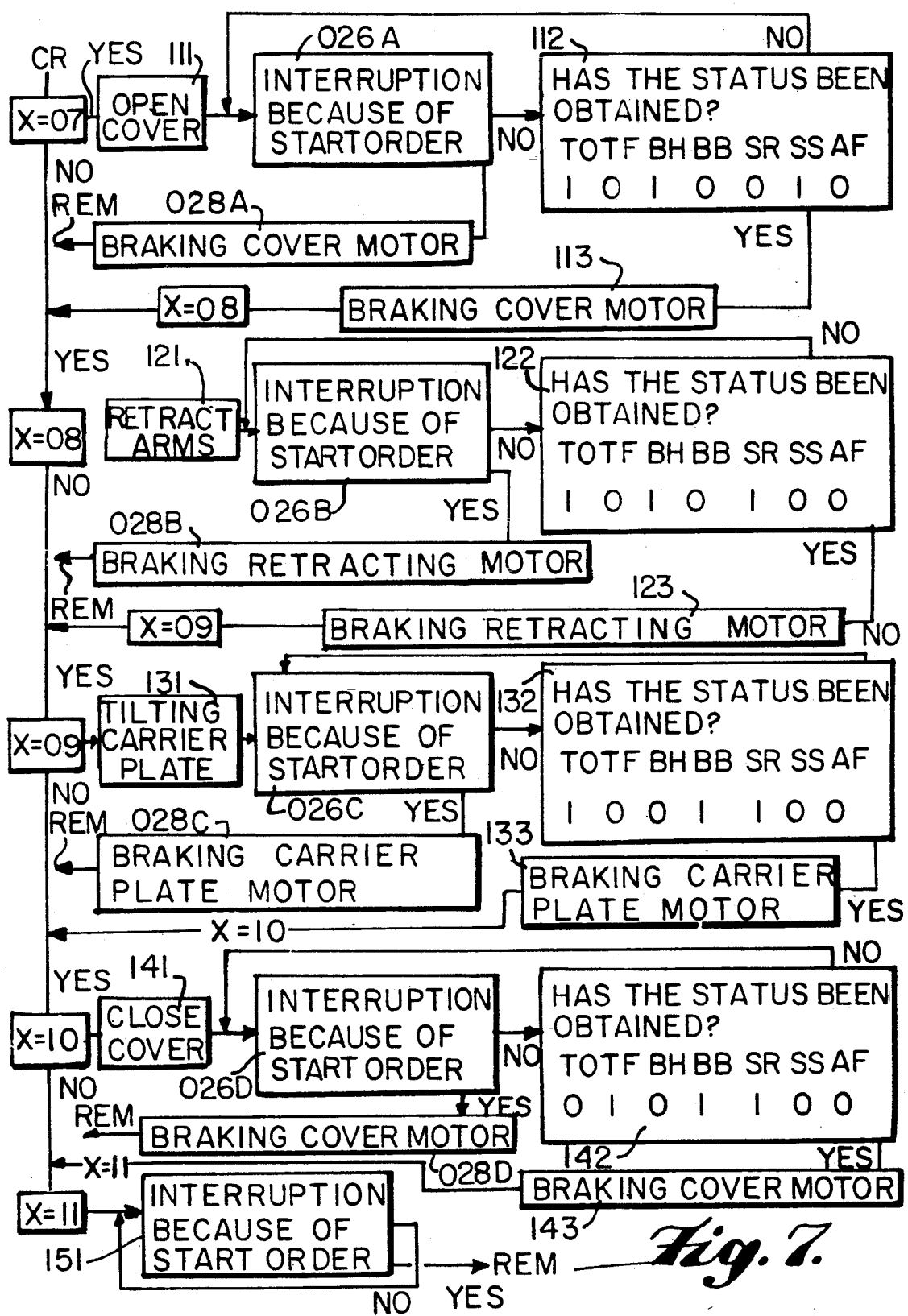
FIG. 7 is a diagram showing the operation of the cycle in which the retractable part of the system is retracted into its housing.

The retracting cycle CR will be described in more detail later in this description, with reference to FIG. 7. In general, it includes the opening of the cover which closes the housing; the folding down of the windshield wiper blade carrier against its support arm; swinging the carrier plate into its lower position; and closing of the cover. However, this cycle is of course entered at a stage in the cycle which depends on the result of the examination in cycle REA.

The retraction cycle CR may be interrupted (step 026) in the same way as the others. If the interruption signal does not correspond to a call for restarting, and if the retraction cycle has not been completed, it is repeated; if it is complete, the system passes into a state in which it awaits an interruption signal (step 027) corresponding to a call for restarting. On receipt of such an interruption signal, the system reverts to the examination cycle REM of the program PPM. If the interruption signal at step 026 itself corresponds to a call for restarting, the system will also revert to the cycle REM, but preferably only after having braked the motor that was being operated, this being again achieved by short circuiting the motor input (step 028).

(C) EXAMINATION CYCLE REM (FIG. 2)

In order to explain the logic of this cycle, it will be assumed that the system includes seven end stop contacts. These will be deemed to be in a logic state 1 when they are closed by the moveable element with which they are associating reaching the end of its appropriate movement; and that they are in a logic state 0 if they are open due to the fact that the said element is not at the end of its movement. Finally, the contacts will be said to be in a state x if that state is unaffected by a given step of the examination cycle, the value x of the contact being able to be validated by means adapted to detect the operating speed of the motor associated with the moveable element. However, there is one exception to the foregoing, in that one of the contacts (the terminal position contact) is open (state 0) when the associated moveable element (the windshield wiper blade carrier) is at the end of its wiping travel, and it is closed when the blade carrier is not in this terminal position.

The seven contacts are as follows:

a "cover open" contact TO, which is closed when the cover which obturates the retraction housing is fully open;

a "cover closed" contact TF, which is closed when the cover is fully closed;

a contact BH for the upward swinging movement of the carrier plate, this contact being closed when the carrier plate is in a fully deployed position;

a contact BB for the downward swinging movement of the carrier plate, this contact being closed when the carrier plate is in its fully retracted position;

a "wiper support retracted" contact SR, which is closed when the windshield wiper blade carrier is fully folded back on the support arm;

a "wiper support extended" contact SS, which is closed when the windshield wiper blade carrier is fully deployed; and a "terminal position" contact AF, which is open when the wiper arrives at its terminal position.

The examination cycle REM consists in comparing successively the logic pattern of the contacts with various predetermined datum configurations. The cycle is terminated when this comparison indicates that the actual configuration of the wiper assembly corresponds to one of the predetermined configurations. The detected actual configuration is then memorised, since the remainder of the operating program for the system depends on this detected configuration.

This configuration can be memorised, for example, quite simply in the form of a step number X of the examination cycle REM, since each successive step corresponds to one predetermined configuration.

Figure 2:
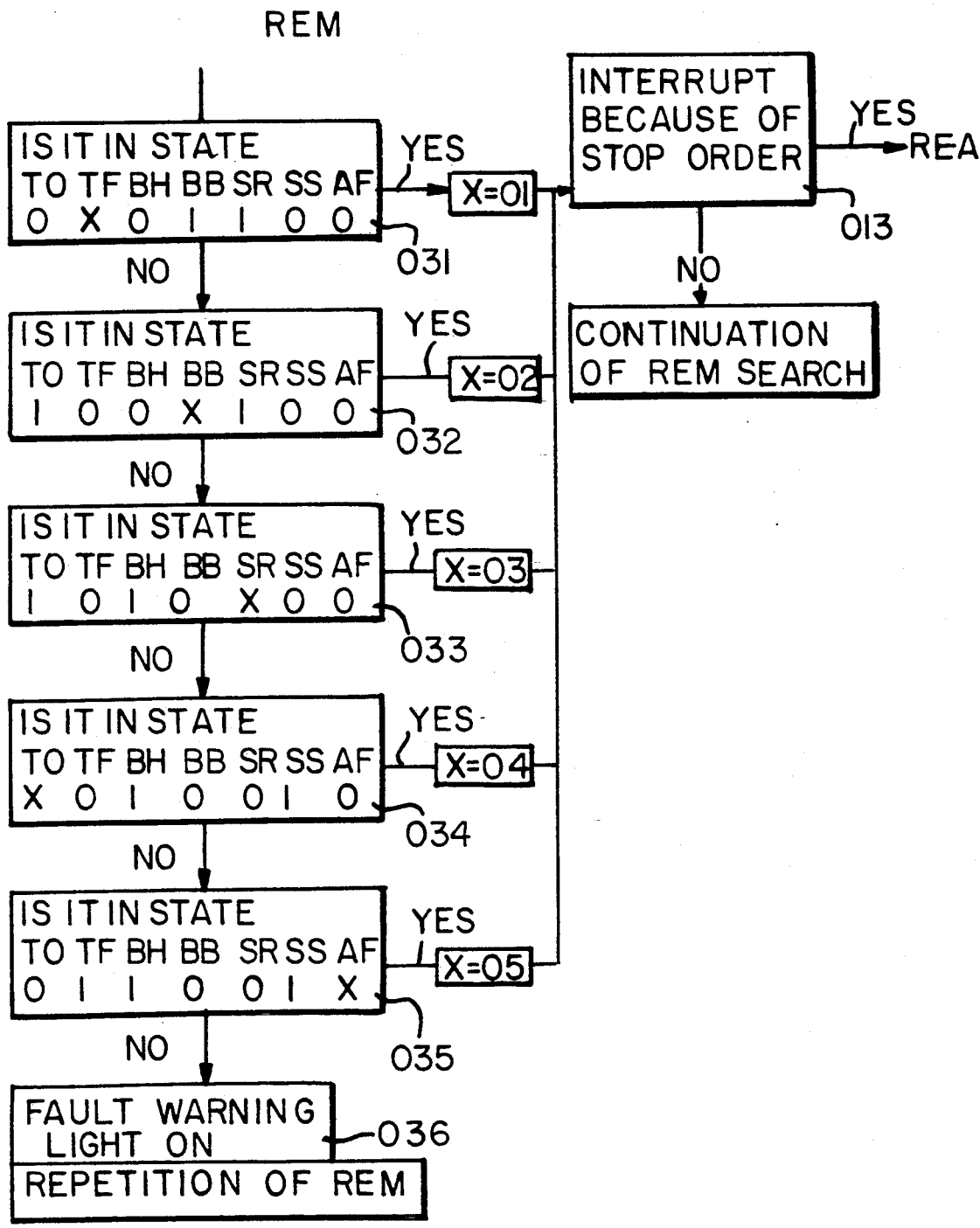
FIG. 2 is a diagram showing the operation of the system during a cycle of examining the state of the system with a view to putting it into operation, and therefore to deployment of the retractable working part of the system.

FIG. 2 shows five successive examination steps 031 to 035, and the result of the examination is indicated by a step number X=01 to X=05, corresponding to one step, or one current state of the wiper assembly. The first examination step 031 consists in verifying whether the actual logic configuration of the group of contacts TO, TF, BH, BB, SR, SS, and AF is the configuration 0, x, 0, 1, 1, 0, 0.

This configuration corresponds to the condition in which the cover is not fully open, the carrier plate is in its lower position, the windshield wiper is in its retracted position, and the latter is at the terminal position of its sweep. If this represents the actual configuration, examination is terminated and the step which is memorised is the step X=01. If not, the cycle passes to the next step.

It will be recalled that the cycle REM, as described here, may be interrupted while in the course of being carried out (step 013), and that it is repeated if the interruption signal does not correspond to a call for stopping received from the master control switching circuit.

The next examination step, 032, consists in verifying whether the actual logic configuration TO, TF, BH, BB, SR, SS, AF is the configuration 1, 0, 0, x, 1, 0, 0. This configuration corresponds with the condition in which the cover is fully open, the carrier plate fully extended, the wiper carrier fully folded back, and the wiper in its terminal position. If this configuration corresponds to the actual situation, examination is terminated and the step memorised is X=02.

If that is not the case, the next step, 033, is proceeded with. The step 033 consists in verifying whether the actual logic configuration TO, TF, BH, BB, SR, SS, AF is the configuration 1, 0, 1, 0, x, 0, 0. This configuration corresponds to the condition in which the cover is fully open, the carrier plate fully extended, and the wiper carrier not fully deployed, and the wiper being in its terminal position. If this is now the actual situation, examination is terminated and the step that is memorised is X=03.

However, if even this is not the case, then the next step, which is the step 034, is proceeded with. The step 034 consists in the detection of the configuration x, 0, 1, 0, 0, 1, 0. This corresponds to the condition in which the cover is not fully closed, but the carrier plate is fully extended and the windshield wiper blade carrier is fully deployed, the wiper again being in its terminal position.

Once again, examination is terminated if that configuration corresponds to the actual situation, in which case the step which is memorised is X=04.

Finally, the step 035 serves to detect the configuration 0, 1, 1, 0, 0, 1, x, which corresponds to a situation in which the cover is fully closed, the carrier plate extended and the blade carrier deployed, with the windshield wiper not being in its terminal position; that is to say the windshield wiper is running.

If by some chance no actual configuration is in fact detected, a fault warning light may be illuminated (step 036), and the examination sequence is repeated.

The object of this cycle REM is thus to determine the state of the system during a starting operation. As will be realised, this state is either an accurately defined state (when all the moveable elements are in one or other of their two terminal positions), or (as happens more often) an indeterminate state, that is to say one in which a moveable element is somewhere along the course of its travel. The state which is detected then, in practice, consists of the fact that the corresponding element is currently in motion.

(D) EXAMINATION CYCLE REA (FIG. 3)

This cycle is somewhat analogous to the cycle REM, but in this example it comprises six configuration examination steps, 041 to 046, corresponding to detected operating steps X=06 to X=11.

The configurations which are detected successively are as follows:

X=06: TO, TF, BH, BB, SR, SS, AF=0, 1, 1, 0, 0, 1, 1 Cover fully closed, carrier plate deployed (high), wiper support deployed, wiping in progress.

X=07: TO, TF, BH, BB, SR, SS, AF=0, x, 1, 0, 0, 1, 0 Cover not fully open, carrier plate high, wiper support deployed, terminal position.

X=08: TO, TF, BH, BB, SR, SS, AF=1, 0, 1, 0, 0, x, 0 Cover fully open, wiper support not fully folded back, terminal position.

X=09: TO, TF, BH, BB, SR, SS, AF=1, 0, x, 0, 1, 0, 0 Cover fully open, carrier plate not fully retracted, wiper support fully folded back, terminal position.

X=10: TO, TF, BH, BB, SR, SS, AF=x, 0, 0, 1, 1, 0, 0 Cover not fully closed, carrier plate retracted, wiper support fully folded back, terminal position.

X=11: TO, TF, BH, BB, SR, SS, AF=0, 1, 0, 1, 1, 0, 0 Cover fully closed, carrier plate retracted, wiper support fully folded back, terminal position.

If, in the course of the examination cycle REA, no actual configuration is detected, a fault warning light may again be illuminated (step 047), and the cycle is repeated.

It should be mentioned again that the cycle REA may be interrupted (step 023) for examination of the master control switching circuit, and then resumed if the interruption signal does not correspond to a call for starting.

(E) DEPLOYMENT CYCLE CD (FIG. 4)

The deployment cycle starts in one position or another, depending on the result of the examination in cycle REM.

If the step that is detected is X=01, the cover is not fully open; it may perhaps equally not be fully closed. The cover motor is actuated in the opening direction (step 051)—but during this opening operation an interruption signal may be received from the microprocessor (step 014A, FIG. 4: cf. FIG. 1). If this interruption signal corresponds to a call for stopping (at a time when a starting sequence is in course of being carried out), the cover actuating motor is preferably braked by applying a short circuit across its input (step 015A). The program is then diverted to the examination cycle REA, which is entered at the step X=10 (cover not fully closed). Consequently, as will be seen from the sequence of steps described above for the parking cycle REA, the cover motor is at once actuated in the closing direction.

A system is thus provided which enables the direction of displacement of one of the moveable elements (in this case the cover) to be immediately reversed when it lies in an intermediate position and a command, countermanding the command which is in course of being carried out, has been given by the control switching circuit. It will be understood that the same arrangement is adopted for the other moveable elements, in respect of each of their directions of motion.

If the interruption signal 014A does not correspond to a call for stopping, step 052 then verifies that the configuration of the contacts TO, TF, BH, BB, SR, SS and AF is 1, 0, 0, 1, 1, 0, 0; if this is the case, i.e. the cover is in fact closed, the cover motor is stopped by applying a short circuit across its input in step 053; the state of the system then corresponds to step X=02, and the deployment cycle CD continues.

When step X=02 is reached, or when the examination cycle REM detects that the system is in step 02, the motor which swings the carrier plate is actuated to swing the latter in the direction of deployment of the carrier plate (step 061). If there is an interruption signal for a call to stop (step 014B), the motor is braked (step 015B), and there is a reversion to the cycle REA, which commences by detecting the step X=09 so that the carrier plate motor is actuated in the reverse direction. If this interruption signal is on the other hand not due to a call for stopping, the system waits for the carrier plate to reach its fully deployed position (step 062), and the motor is then braked (step 063). This leads to step X=03, and the deployment cycle is continued.

If step X=03 is reached in this way, or if the examination cycle REM detects that the system is in fact in this step for one reason or another, the wiper arm deployment motor is actuated in the appropriate direction to deploy the blade carrier support (step 071). The cycle is the same as for the cover and carrier plate: an interruption signal (014C) resulting from a call for stopping will revert the system to the REA cycle at step X=08, and thus to reversal of the motor which has previously been braked (015C), so that the support arm is now swung back. Otherwise, full unfolding of the support arm is awaited (step 072), the corresponding actuating motor is braked, and the system passes to the next following step, X=04, of the deployment cycle.

The step X=04 is similar, and corresponds to reclosing of the cover by actuation of the cover motor in the closing direction (081), with an interruption signal 014D. In this step there are two alternative possibilities: either braking of the motor (015D) and reversion to the REA cycle leading to step X=07 and reopening of the cover; or, a delay period to wait for the cover to reach its fully closed position (082), followed by braking (083) leading to step X=05.

The deployment cycle CD is then terminated, and the system passes to the windshield wiping cycle CB. As has already been said, it is also possible to reach the wiping cycle without passing via the deployment cycle, if the examination cycle REM indicates that it is at step X=05, because in this step the windshield wiper is ready to wipe the windshield.

(F) WIPING CYCLE (FIG. 5)

The wiping cycle thus starts with step X=05, and includes the actuation of the wiping motor (step 091); the conventional to-and-fro sweeping movement of the wiper continues so long as no interruption signal is received to call for stopping (step 016; CF FIG. 1).

If an interruption signal is received, corresponding to a call for stopping, the arrival of the wiper at its terminal position is awaited (step 017A), and the wiper motor is then braked by applying a short circuit across its input (017B), after which the examination cycle REA is carried out with a view to demonstrating that it is in step X=07.

(G) TERMINAL POSITIONING CYCLE ARF (FIG. 6)

The operation of stopping the wiper and then parking the wiper assembly involves the need to allow the wiper to return to its terminal position. However, if a command for restarting is given in the course of this operation, it is necessary to revert to the normal wiping program. This is why a specific cycle for returning the wiper to its terminal position has been provided. This cycle deals, in particular, with the case in which the wiper is stopped partway through its travel when the ignition key of the vehicle is turned, the control switching circuit being in a "stop" position.

The cycle ARF commences to operate if the system is in step X=06, and in particular when the examination cycle REA has detected that this is the current step. The wiper motor is then actuated (step 101). An interruption signal can then be produced (102). If it corresponds to a call for restarting, movement of the wiper into its terminal position is first of all awaited (103); the wiper motor is then braked (104); and the system then passes to the examination cycle REM for restarting. The cycle REM will then seek to establish that the system is in step X=05, and wiping can then be carried out. However, if the interruption signal 102 is not a call for restarting, movement to the terminal position is awaited (105) and the wiper motor is braked (106) as before; but the system is then in step X=07 which corresponds to the start of the retraction cycle CR.

(H) RETRACTION CYCLE CR (FIG. 7)

The retraction cycle includes the steps X=07 to X=11, and parking can be carried out during this cycle at any one of these steps. When retraction is carried out logically after the windshield wiping cycle CB has been interrupted as a result of a signal from the control switching circuit, retraction takes place at step X=07; but retraction can be effected at any one of the steps X=07 to X=11 in accordance with the result of the examination in cycle REA when the retraction cycle CR is run following a cycle REA.

In all cases, the cycle CR runs in the numerical order of the steps corresponding to X=07, then X=08, etc. up to X=11.

The step X=07 first comprises actuation of the cover motor in the opening direction (111). An interruption signal may be produced (026A); if this consists of a call for restarting, the cover motor is braked (028A), and the system reverts to the examination cycle REM for the purpose of detecting that it is in step X=04, so that the cover will be immediately reclosed (see the deployment cycle CD). If, however, the interruption signal does not correspond to a call for restarting, completion of the opening of the cover is awaited (112), and the motor is then braked, whereupon the current step becomes X=08, which is the next following step of the retraction cycle.

Step X=08 is substantially similar: actuation of the motor which controls deployment of the blade carrier, but in the reverse direction so as to retract the latter (121); an interruption signal (026B), braking of the retraction motor (028B), and transfer to the examination cycle REM if the interruption signal is a call for starting. The step which is then detected will be X=03, and the support arm will immediately be redeployed. However, if the interruption signal is not a call for restarting, full retraction of the arm is awaited (122), and the motor is then braked (123), leading to the next following step X=09.

Step X=09 commences with actuation of the retraction motor so as to swing the carrier plate downwardly (131); an interruption signal (026C) may then directly cause this motor to be braked (028C) if it corresponds to a call for restarting; the examination cycle REM is then reverted to. The step detected during the course of the cycle REM is then step X=02, so that the carrier plate will once again be swung upwardly without delay. However, if the interruption signal does not correspond to a call for restarting, arrival of the carrier plate in its fully retracted position is awaited (132), and the motor is then braked (step 133), whereupon the system passes to the next following step X=10.

Step X=10 takes place in the same way so as to close the cover: actuation of the cover motor in the closing direction (141), interruption signals (026D), braking (028D) if there is a call for starting, and then a return to the REM cycle, detection of the step X=01, and immediate re-opening of the cover. Alternatively, the arrival of the cover in its fully closed position (142) may be awaited, followed by braking (143) and transfer to step X=11.

Step X=11 represents the condition in which the retractable wiper assembly is fully parked, entirely inside its housing. An interruption signal corresponding to a command for starting is therefore awaited (151). Such an interruption signal will direct the program towards the cycle REM of the program PPM.

A system for parking and deployment of a retractable member has now been described. In this system, a command that countermands another command which is currently being carried out may be given and itself carried out immediately, even if the moveable elements of the mechanical system are not in a position that can be precisely determined, i.e. a position at the end of their travel.

The operation described above is highly symmetrical, with the reaction to a command for parking during a deployment phase being substantially analogous to the reaction of the control system to an order for deployment during a parking phase.

However, an asymmetrical system may be provided, in which it is only deployment that benefits from the advantage given by the invention in that there is no delay in carrying out an order countermanding an order currently being executed.

What is claimed is:

1. A system for deploying a retractable member from a housing and parking it therein, said system comprising at least one retractable, moveable element which is displaceable between a parked position and a deployed position, and a motor for moving said element between these positions, a first end stop sensor for detecting when said element reaches an end of its movement to its parked position, and a second end stop sensor for detecting when the moveable element reaches its deployed position, the system further comprising detecting means adapted to detect the speed of operation of the motor and means for reversing the driving direction of the motor when a command is given that reverses a command which is in course of being carried out while at the same time the detecting means indicate that the moveable element is disposed somewhere between the two end stop sensors.

2. A system according to claim 1, wherein the reversal of the driving direction of the motor is immediate.

3. A system according to claim 1, wherein the means for reversing the driving direction are arranged to control a braking means for effecting braking prior to the reversal taking place.

4. A system according to claim 3, wherein said braking means include means adapted to brake the motor which controls said moveable element while the latter is being displaced, prior to the reversal of its direction of movement.

5. A system according to claim 4, wherein said braking means comprise means for applying a short circuit across the input of the motor.

6. A system according to claim 1, comprising a plurality of said moveable elements displaceable successively between a parked position and a deployed position, the movement of each of said moveable elements being instantaneously reversible in response to a command contrary to the command which is in course of being carried out, without waiting for said moveable element to complete its movement.

7. A system according to claim 1, further comprising first and second current state examination means for establishing a first cycle and a second cycle respectively for examining the current state of the system by examining the state of the end stop contacts of the end stop sensors, means for performing the first examination cycle when, simultaneously, the moveable element is in the course of being parked and a command is given for its deployment, and means for carrying out the second examination cycle when, simultaneously, the moveable element is in the course of being deployed and an order for parking is given, the system further comprising means for executing a deployment cycle of the moveable member by commencing said deployment cycle from the state detected by the first examination cycle, and means for executing a retraction cycle by commencing the latter cycle from the state detected by the second examination cycle.

8. A system according to claim 7, wherein the current state examination means are arranged so that the respective examination cycles include successive steps for examining the configuration of the states of the end stop sensors, at least one said step comprising the examination of a configuration in which the state of said first end stop sensor corresponds to the position of the associated moveable element being other than at the end of its travel when the state of the associated said second end stop sensor is unaffected.

9. A system according to claim 8, wherein said detecting means comprise a computer adapted to calculate the movement of the motor as a function of the intensity of electrical current which it consumes.

* * * * *